United States Patent
Daigle et al.

(10) Patent No.: US 12,467,990 B2
(45) Date of Patent: Nov. 11, 2025

(54) MAGNETORESISTANCE SIGNAL PATH COMPENSATION

(71) Applicant: Allegro MicroSystems, LLC, Manchester, NH (US)

(72) Inventors: Tyler Daigle, Scarborough, ME (US); Steven Daubert, Bedford, NH (US); Srujan Shivanakere, Nashua, NH (US); Craig Hiller, North Andover, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 211 days.

(21) Appl. No.: 18/458,441

(22) Filed: Aug. 30, 2023

(65) Prior Publication Data

US 2025/0076421 A1  Mar. 6, 2025

(51) Int. Cl.
*G01R 33/09* (2006.01)
*G01R 33/00* (2006.01)

(52) U.S. Cl.
CPC ....... *G01R 33/098* (2013.01); *G01R 33/0052* (2013.01); *G01R 33/0094* (2013.01)

(58) Field of Classification Search
CPC combination set(s) only.
See application file for complete search history.

(56) References Cited

U.S. PATENT DOCUMENTS

| | | | |
|---|---|---|---|
| 7,777,607 B2 | 8/2010 | Taylor et al. | |
| 7,859,255 B2 | 12/2010 | Doogue et al. | |
| 8,453,518 B2 | 6/2013 | Diekmann et al. | |
| 10,509,058 B2 | 12/2019 | Cadugan et al. | |
| 10,746,820 B2 | 8/2020 | Lassalle-Balier et al. | |
| 10,809,094 B2 | 10/2020 | Foletto et al. | |
| 10,866,287 B1 | 12/2020 | Lassalle-Balier et al. | |
| 11,199,424 B2 | 12/2021 | Lassalle-Balier et al. | |
| 11,327,127 B2 | 5/2022 | Lassalle-Balier et al. | |
| 11,525,875 B2 | 12/2022 | Lassalle-Balier et al. | |

(Continued)

FOREIGN PATENT DOCUMENTS

| CN | 112363097 | * | 2/2021 | ............. G01R 33/00 |
|---|---|---|---|---|
| CN | 112363097 A | | 2/2021 | |

(Continued)

OTHER PUBLICATIONS

PCT International Search Report and Written Opinion dated Feb. 4, 2025 for International Application No. PCT/US2024/036477; 20 Pages.

(Continued)

*Primary Examiner* — Alvaro E Fortich
(74) *Attorney, Agent, or Firm* — DALY, CROWLEY, MOFFORD & DURKEE, LLP

(57) ABSTRACT

Methods and apparatus for a magnetic field sensor having a first set of MR elements configured to change in resistance due to an applied magnetic field having an orientation in a sensitive axis of the first set of MR elements and a second set of MR elements that are immune to the applied magnetic field. The second set of MR elements is configured to change in resistance due to temperature. A processor can compensate for the response of the first set of MR elements based on the temperature information from the second set of MR elements.

10 Claims, 11 Drawing Sheets

(56) References Cited

U.S. PATENT DOCUMENTS

| | | | |
|---|---|---|---|
| 2013/0300402 A1* | 11/2013 | Liu | G01R 33/0035 |
| | | | 324/252 |
| 2014/0015525 A1* | 1/2014 | Paci | G01R 33/09 |
| | | | 324/252 |
| 2019/0234763 A1* | 8/2019 | Foletto | G01R 33/025 |
| 2019/0235032 A1* | 8/2019 | Lassalle-Balier | G01R 33/093 |
| 2021/0041511 A1 | 2/2021 | Romero et al. | |
| 2021/0293911 A1 | 9/2021 | Lassalle-Balier et al. | |
| 2022/0308131 A1* | 9/2022 | Romero | G01R 33/0023 |
| 2023/0251290 A1 | 8/2023 | Vuillermet et al. | |

FOREIGN PATENT DOCUMENTS

| | | |
|---|---|---|
| JP | H 01-270613 A | 10/1989 |
| JP | 2006-047004 A | 2/2006 |

OTHER PUBLICATIONS

PCT Invitation to Pay Additional Fee's and Partial Search Report dated Nov. 8, 2024 for International Application No. PCT/US2024/036477; 47 Pages.

U.S. Appl. No. 18/458,509, filed Aug. 30, 2023, Romero.

U.S. Appl. No. 18/152,189, filed Jan. 10, 2023, Romero.

Mathon, "Theory of Tunneling Magnetoresistance;" Article from *Phase Transitions*, vol. 76, Nos. 4-5; Jan. 2003; pp. 491-500; 11 Pages.

\* cited by examiner

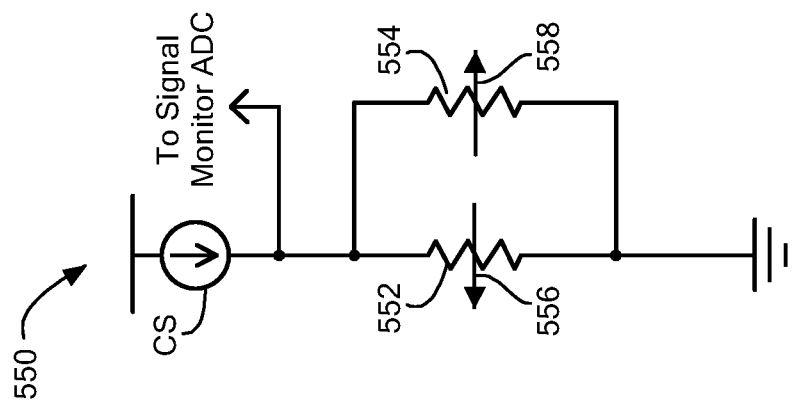
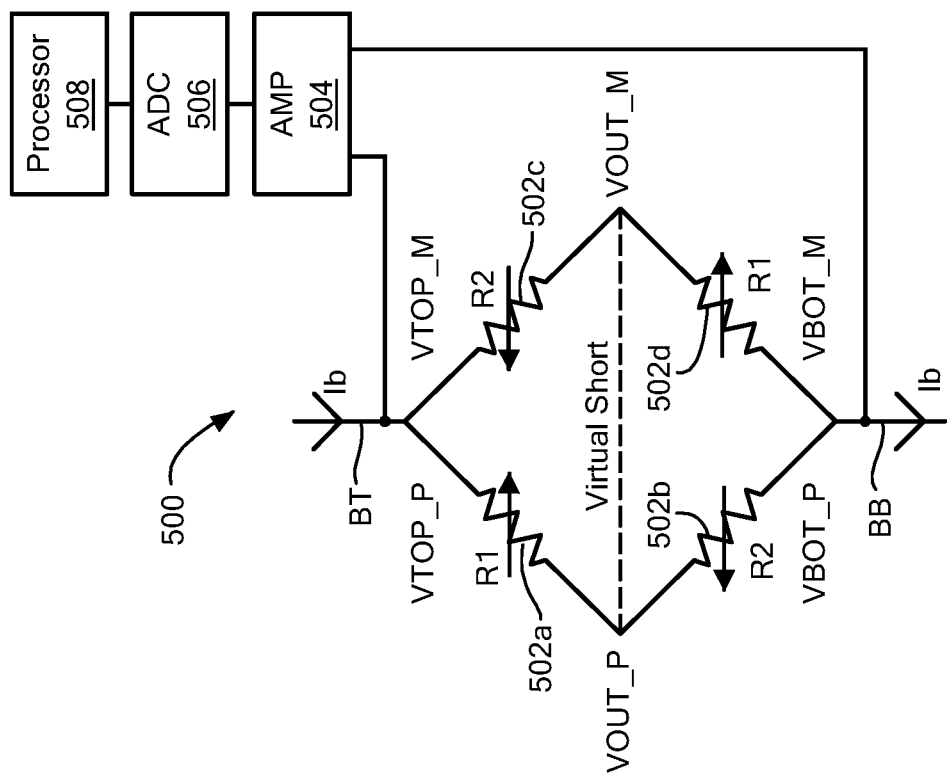
*FIG. 5A*
*FIG. 5B*
*FIG. 5C*

MAGNETORESISTANCE SIGNAL PATH COMPENSATION

BACKGROUND

Magnetic field sensors are used in a variety of applications, including, but not limited to, angle sensing that senses an angle of a direction of a magnetic field, current sensing that senses a magnetic field generated by a current carried by a current-carrying conductor, magnetic switching that senses the proximity of a ferromagnetic object, rotation detection that senses passing ferromagnetic articles, for example, magnetic domains of a ring magnet or a ferromagnetic target (e.g., gear teeth) where the magnetic field sensor is used in combination with a back-biased or other magnet, and magnetic field sensing that senses a magnetic field density of a magnetic field.

In certain applications, magnetic field sensors include magnetoresistance (MR) elements. These elements have an electrical resistance that changes in the presence of an external magnetic field. Spin valves are a type of magnetoresistance element formed from two or more magnetic materials or layers. The simplest form of a spin valve has a reference (or magnetically fixed) layer and a free layer. The resistance of the spin valve changes as a function of the magnetic alignment of the reference and free layers. Typically, the magnetic alignment of the reference layer does not change, while the magnetic alignment of the free layer moves in response to external magnetic fields.

In some cases, a spin valve may also have a bias. The bias may be generated by one or more magnetic layers (bias layers) that are magnetically coupled to the free layer. In the absence of an external magnetic field, the bias layers may cause the magnetic alignment of the free layer to default to a predetermined alignment. The magnetic coupling between the bias layers and the free layer is relatively weak so that an external field can override the bias and realign the magnetic alignment of the free layer.

One drawback of known MR devices is that for non-ideal effects, such as temperature variation, stress variation, and non-linearity, it can be difficult to provide compensation. Temperature and stress are typically compensated for by measuring using a separate sensor that may not completely match the primary TMR/GMR sensing element. In some conventional devices, temperature may be measured using bipolar junction transistors, which represent the die's temperature at a specific location where the sensor is instantiated and at the substrate/well level. Looking at a cross section, the MR elements may be higher up above the metal layers. Any temperature gradient (both vertically and laterally) results in compensation error. This same scenario can be applied to stress compensation. It is difficult to directly sense the temperature, stress, etc., of the MR device.

In addition, in order to pin MR elements, i.e., set the direction of magnetic field in which the element is sensitive, the elements are locally heated with the magnetic field applied. MR elements can be locally heated with a laser for laser pinning. Laser pinning requires a minimum area of elements to be pinned, i.e., the laser shot area, and a minimum spacing to neighboring devices that should not be pinned or that will be pinned in another direction. With constraints on unit resistance, overall resistance, area, aspect ratio, and routing, it can be difficult to optimize the MR area usage.

SUMMARY

Embodiments of the disclosure provide methods and apparatus for a MR sensor with signal path compensation. In example embodiments, MR (magneto resistor) temperature, stress, and/or non-linearity can be measured directly by using secondary field-immune MR elements which are layout-matched to the primary signal path sensing element. In some embodiments, magnetic field immune MR elements are configured by placing two anti-pinned MR arrays, i.e., arrays pinned in opposite directions, in parallel or series.

In general, for enhanced matching of MR devices that are laser pinned in different directions, it may be beneficial to layout the unit areas in a cross-centro, checkered, and/or interleaved pattern. To compact the maximum number of MR elements into a fixed area, which may be referred to as the laser shot, with the most freedom for series/parallel combinations while minimizing the number of metal layers required for routing, some embodiments use quadrilateral symmetry. Quadrilateral symmetry provides enhanced laser pinned unit matching while allowing rotation in right angle for ease of routing.

In one aspect, a magnetic field sensor comprises: a first set of MR elements forming a bridge to output a signal corresponding to an applied magnetic field having an orientation in a sensitive axis of the bridge; a second set of MR elements that are immune to the applied magnetic field, wherein the second set of MR elements are configured to change in resistance due to temperature; and a processor to compensate for a response of the first set of MR elements based on an output from the second set of MR elements.

A sensor can include one or more of the following features: the second set of MR elements include anti-pinned first and second MR elements coupled in series, the second set of MR elements include first and second MR elements coupled in parallel that are pinned in opposite directions, the second set of MR elements comprise at least four MR elements configured in a Wheatstone bridge configuration, the MR elements in the first and second sets of elements comprise TMR elements, the bridge comprises four components that form the bridge, wherein a first one of the four components includes a series of pillar arrays each having a laser pinning unit area for pinning the pillar arrays in give orientation, the laser pinning unit area comprises sub-groups having quadrilateral symmetry, the laser pinning unit area comprises sub-groups having compound quadrilateral symmetry, and/or the first set of MR elements are interleaved with the second set of MR elements.

In another aspect of the disclosure, a sensor comprises: a magnetic field sensing bridge having first, second, third, and fourth TMR elements configured to change in resistance due to an applied magnetic field, wherein the first MR element comprises a series of pillar arrays each having a same pinning orientation, wherein each of the pillar arrays comprises subgroups of pillars having quadrilateral symmetry. The bridge may have first and second terminals configured to output a signal corresponding to the applied magnetic field and third and fourth terminals configured to output a signal corresponding to temperature.

In another aspect of the disclosure, a method comprises: employing a first set of MR elements forming a bridge to output a signal corresponding to an applied magnetic field having an orientation in a sensitive axis of the bridge in a magnetic field sensor; employing a second set of MR elements that are immune to the applied magnetic field, wherein the second set of MR elements are configured to change in resistance due to temperature; and performing processing to compensate for a response of the first set of MR elements based on an output from the second set of MR elements.

A method can include one or more of the following features: the second set of MR elements include anti-pinned first and second MR elements coupled in series, the second set of MR elements include first and second MR elements coupled in parallel that are pinned in opposite directions, the second set of MR elements comprise at least four MR elements configured in a Wheatstone bridge configuration, the MR elements in the first and second sets of elements comprise TMR elements, the bridge comprises four components that form the bridge, wherein a first one of the four components includes a series of pillar arrays each having a laser pinning unit area for pinning the pillar arrays in give orientation, the laser pinning unit area comprises sub-groups having quadrilateral symmetry, the laser pinning unit area comprises sub-groups having compound quadrilateral symmetry, and/or the first set of MR elements are interleaved with the second set of MR elements.

In another aspect of the disclosure, a method comprises: forming a magnetic field sensing bridge having first, second, third, and fourth TMR elements configured to change in resistance due to an applied magnetic field, wherein the first MR element comprises a series of pillar arrays each having a same pinning orientation, wherein each of the pillar arrays comprises subgroups of pillars having quadrilateral symmetry. The bridge may have first and second terminals configured to output a signal corresponding to the applied magnetic field and third and fourth terminals configured to output a signal corresponding to temperature.

BRIEF DESCRIPTION OF THE DRAWINGS

The foregoing features of this invention, as well as the invention itself, may be more fully understood from the following description of the drawings in which:

FIG. 5A is a circuit diagram of an example bridge that can form part of a compensation circuit;

FIG. 5B is a circuit diagram of an example field-immune secondary bridge for sensing temperature;

FIG. 5C is a circuit diagram of a further example field-immune secondary bridge for sensing temperature;

DETAILED DESCRIPTION

Figure 1:
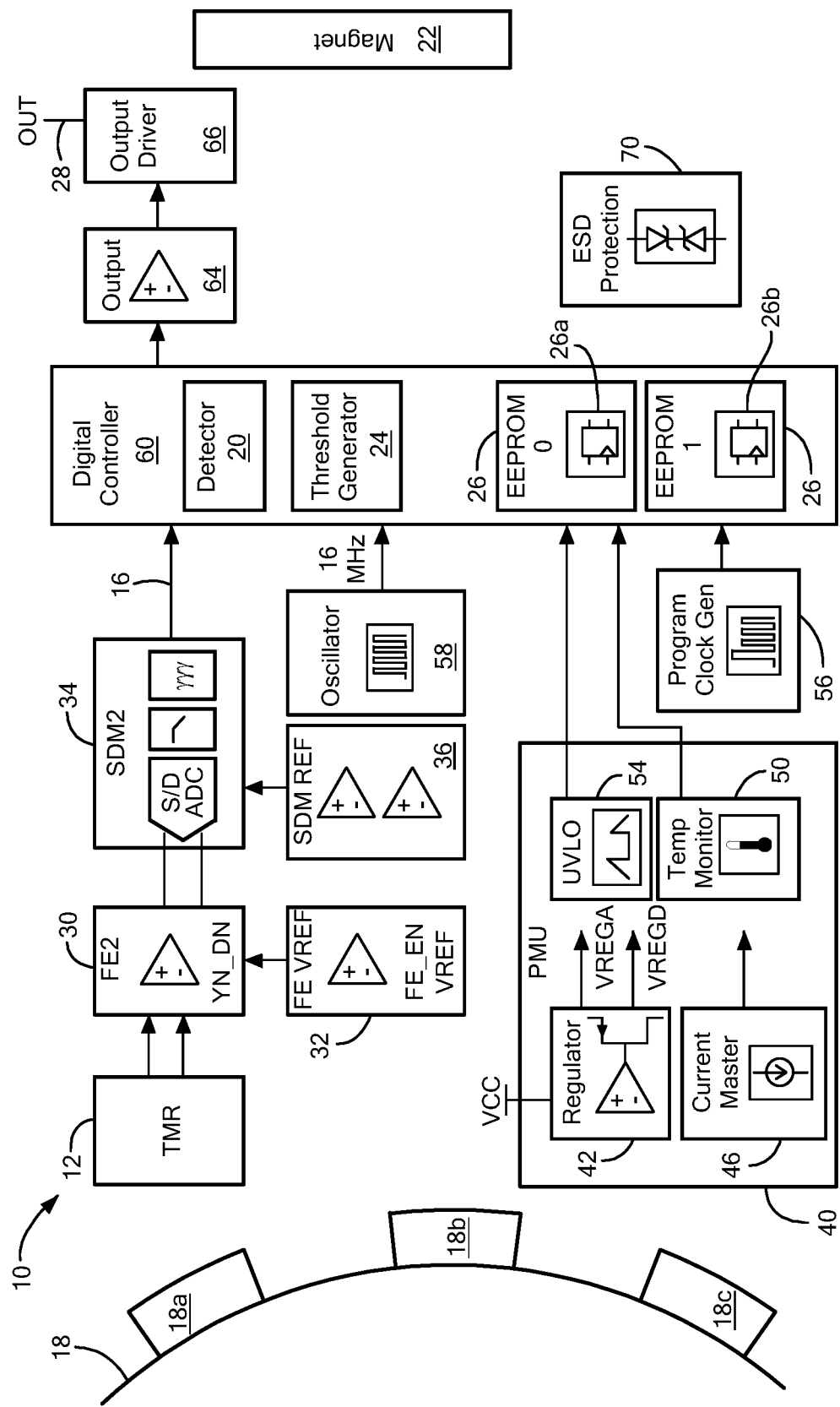
FIG. 1 is a schematic representation of an example sensor having an MR element with compensation.

FIG. 1 shows an example magnetic field sensor 10 having at least one magnetic field sensing element 12 that includes one or more MR elements for signal compensation in accordance with example embodiments of the disclosure. The sensor 10 is configured to generate a magnetic field signal 16 indicative of a magnetic field associated with a target 18 and a detector 20 responsive to the magnetic field signal and to a threshold level from a threshold generator 24 to generate a sensor output signal 28 containing transitions associated with features of the target in response to the magnetic field signal crossing the threshold level.

The target 18 can have a variety of forms, including, but not limited to a gear having gear teeth 18a-18c or a ring magnet having one or more pole pair. Also, linear arrangements of ferromagnetic objects that move linearly are possible. In the example embedment of FIG. 1, magnetic field sensor 10 may take the form of a rotation detector to detect passing gear teeth, for example, gear teeth 18a-18c of a ferromagnetic gear or, more generally target object 18. A permanent magnet 22 can be placed at a variety of positions proximate to the gear 18, resulting in fluctuations of a magnetic field proximate to the gear as the gear rotates in a so-called "back-bias" arrangement.

Features of the target 18 are spaced from the sensing elements 12 by an airgap. Although intended to be fixed once the sensor 10 is in place in a particular application, the airgap can vary for a variety of reasons. A difference between angles of the transitions of the sensor output signal 28 and locations of the associated features 18a-18c of the target 28 is referred to as a "hard offset."

Sensing elements 12 can take a variety of forms, such as TMR elements, as may be arranged in one or more bridge or other configurations in order to generate one or more single-ended or differential signals indicative of the sensed magnetic field. A front-end amplifier 30 can be used to process the magnetic field sensing element output signal to generate a further signal for coupling to an analog-to-digital converter (ADC) 34 as may include one or more filters, such as a low pass filter and/or notch filter, and as may take the form of a sigma delta modulator to generate a digital magnetic field signal 16. Features of the magnetic field signal processing can include a front-end reference 32 and a sigma delta reference 36.

Sensor 10 includes a power management unit (PMU) 40 as may contain various circuitry to perform power management functions. For example, a regulator 42 can output a regulated voltage for powering analog circuitry of the sensor (VREGA) and/or a regulated voltage for powering digital circuitry of the sensor (VREGD). A bias current source 46, a temperature monitor 50 and an undervoltage lockout 54 can monitor current, temperature, and voltage levels and provide associated status signals to a digital controller 60. A clock generation element 56 and an oscillator 58 are coupled to the digital controller 60.

Digital controller 60 processes the magnetic field signal 16 to determine the speed, position, and/or direction of movement, such as rotation of target 18 and outputs one or more digital signals to an output protocol module 64. More particularly, controller 60 determines the speed, position, and/or direction of target 18 based on the magnetic field signal 16 and can combine this information with fault information in some embodiments to generate the sensor output signal 28 in various formats. The output of module 64 is fed to an output driver 66 that provides the sensor output signal 28 in various formats, such as a so-called two-wire format in which the output signal is provided in the form of current pulses on the power connection to the sensor or a three-wire format in which the output signal is provided at a separate dedicated output connection. Formats of the output signal 28 can include variety of formats, for example a pulse-width modulated (PWM) signal format, a Single Edge Nibble Transmission (SENT) format, a Serial Peripheral Interface (SPI) format, a Local Interconnect Network (LIN) format, a CAN (Controller Area Network) format, an Inter-Integrated Circuit ($I^2C$) format, or other similar signal formats. Sensor 10 can further include electrostatic discharge (ESD) protection 70.

The digital controller 60 includes detector 20, threshold generator 24, and memory 26 such as EEPROMs 26a, 26b. Memory 26 can be used to store values for various sensor functionality including storing function coefficients for use by the threshold generator 24 in generating the adaptive threshold levels for use by detector 20.

Detector 20 is coupled to receive the threshold level thus generated and the magnetic field signal 16 and compare the received levels to generate a binary, two-state, detector output signal that has transitions when the signal 16 crosses the threshold level. Movement speed of the target 18 can be detected in accordance with the frequency of the binary signal.

It should be appreciated that a direction of rotation of the target 28 may be determined in embodiments containing multiple sensing elements 12 configured to generate phase separated magnetic field signals (as are sometimes referred to as channel signals), in which case the direction of rotation can be determined based on a relative phase or relative time difference (e.g., lag or lead) of a particular edge transition of detector output signals associated with the phase separated magnetic field signals.

It is understood that embodiments of MR-based sensing elements are useful in a wide variety of magnetic sensors. While an example sensor is shown and described above, any practical magnetic sensor in which MR sensing elements are desirable can be provided. For example, MR sensing elements are useful in many magnetic position and angle sensors that require high resolution. Further example sensors in which MR-based sensing elements are shown and described below.

Figure 2:
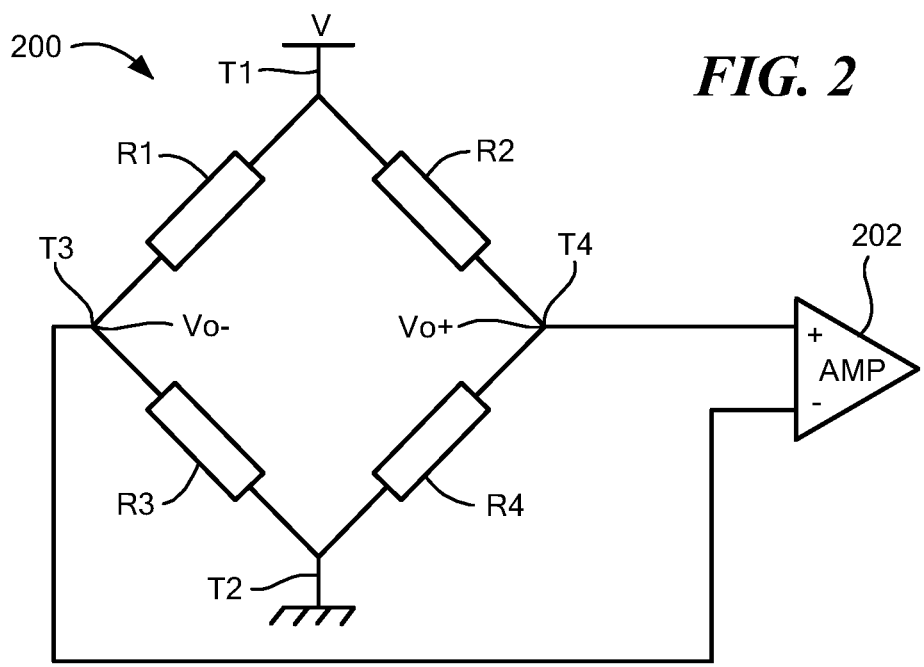
FIG. 2 is schematic representation of an MR bridge with MR elements.

FIG. 2 shows an example TMR bridge 200 having a first resistor R1, a second resistor R2, a third resistor R3, and fourth resistor R4 coupled in a bridge configuration, which can correspond to the sensing elements 12 of FIG. 1. A first terminal T1 is coupled to a voltage supply and a second terminal T2 is coupled to ground (or other potential). A third terminal T3 provides a first differential output signal Vo− and a fourth terminal T4 provides a second differential output signal Vo+. The differential output Vo+, Vo− of the bridge can be provided to an amplifier AMP 202 or other circuitry for processing of the output of the magnetic field sensing elements, such as described above.

Figure 3:
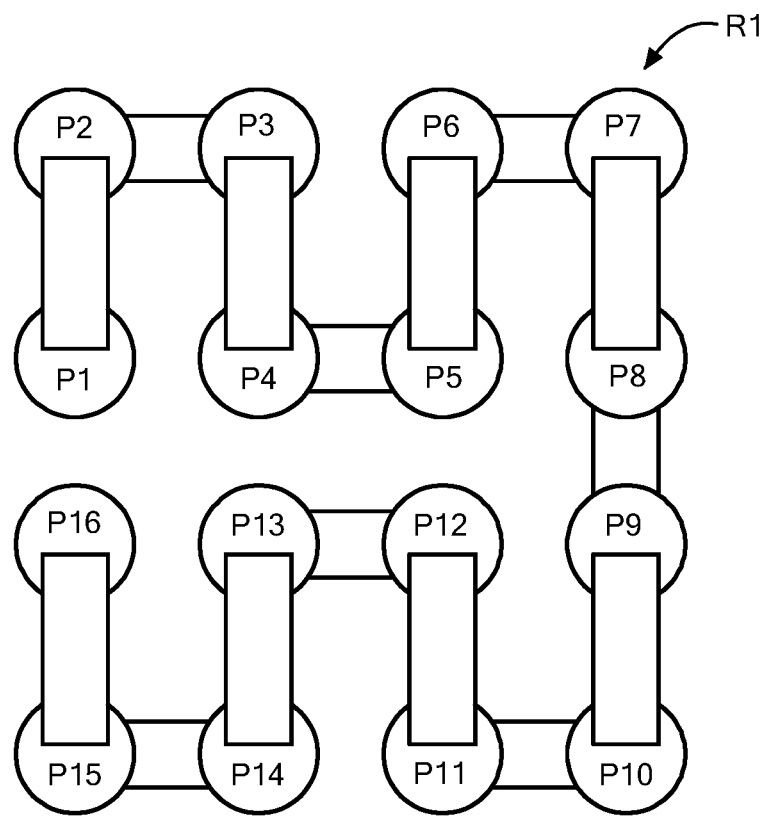
FIG. 3 is a schematic representation of a bridge resistor having TMR pillars.

FIG. 3 shows an example implementation in which bridge resistor R1 contains sixteen pillars P1-16 that provide the total resistance for R1. It is understood that a TMR resistor that provides a leg of the bridge can comprise any practical number of pillars connected in series and/or in parallel to provide the TMR bridge resistor. Pillars can be designed to have the same or different resistances.

Figure 4:
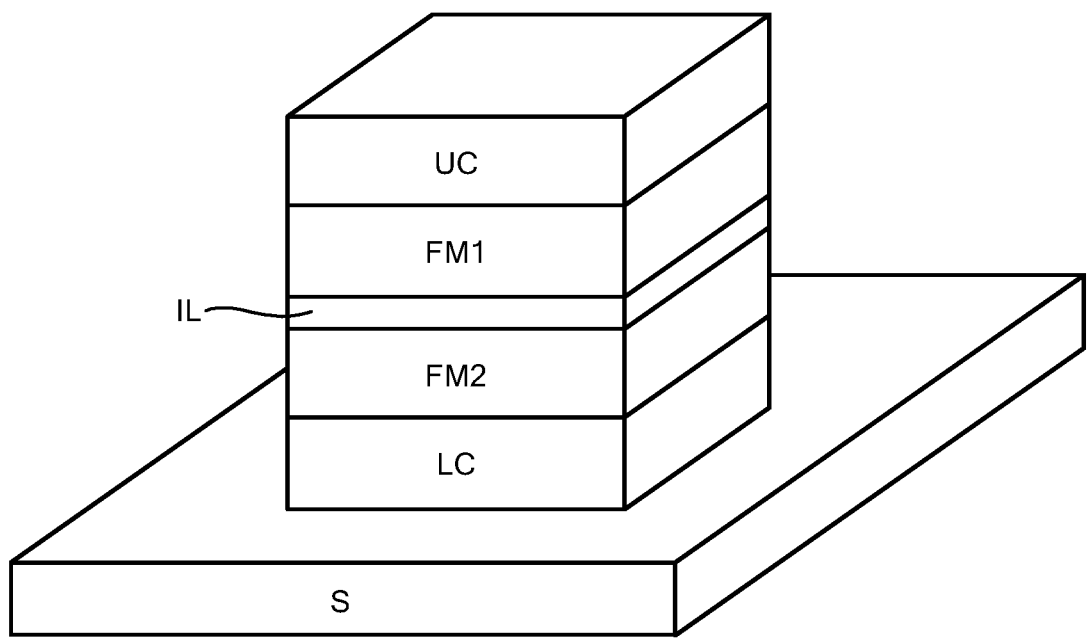
FIG. 4 is a schematic representation of a MTJ with tunneling magnetoresistance.

FIG. 4 shows an example magnetic tunnel junction (MTJ) that uses TMR to provide TMR elements, e.g., pillars. As is known in the art, tunneling magnetoresistance (TMR) occurs in a magnetic tunnel junction (MTJ) which has first and second ferromagnets FM1, FM2 separated by a thin insulative layer IL, such as MgO. An upper contact UC can be provided on the first ferromagnet FM1 and a lower contact LC can be provided on the second ferromagnet FM2. A substrate S can support the MTJ structure. The insulative layer should be thin, in the order of a few nanometers, so as to allow electrons to 'tunnel' from one of the ferromagnets to the other. It will be appreciated that this is a quantum mechanical phenomenon.

The direction of the two magnetizations of the ferromagnetic films FM1, FM2 can be switched individually by an external magnetic field. If the magnetizations are in a parallel orientation it is more likely that electrons will tunnel through the insulating film IL than if they are in the oppositional (antiparallel) orientation. Consequently, such a junction can be switched between two states of electrical resistance, one with low resistance and one with high resistance.

It is understood that the directions of FM1 and FM2 do not necessarily have to be switched: if the external field angle is neither parallel or anti-parallel then the resulting magnetization changes as the composite angle between the external field and the reference layer. The resistance variation is proportional to the cosine of such composite angle which makes TMR elements useful for angle sensing applications.

Electrons with certain spin orientation ("spin-up" or "spin-down") can tunnel from one ferromagnetic layer to another ferromagnetic layer through the non-conductive thin insulating layer if there are available free states with the same spin orientation. In case of the parallel state, the majority spin ("spin-up") electrons and minority spin ("spin-down") electrons can tunnel to the second ferromagnetic layer and fill majority ("up") and minority ("down") states, respectively. This will result in large conductance and corresponds to the low resistive state. In case of the anti-parallel state, the majority spin ("spin-down") electrons and minority spin ("spin-up") electrons from first ferromagnetic layer fill the minority ("down") and majority ("up") states in the second ferromagnetic layer, respectively. This will result in the low conductance and corresponds to the high resistive state. Tunneling magnetoresistance is described in J. Mathon, *Theory of Tunneling Magnetoresistance,* 76 PHASE TRANSITIONS 491-500 (2003), which is incorporated herein by reference.

As noted above, MR sensing elements are prone to drift due to temperature, stress, and other environmental conditions. To compensate for these errors, it may be beneficial to measure a matched sensing device that is exposed to the same environmental conditions, but independent of magnetic field. For example, a TMR field sensing bridge may have a predictable temperature coefficient for both offset and sensitivity. To measure the temperature of a primary bridge, the temperature of a secondary TMR device may be measured. The secondary should be configured to be magnetic field independent and be proximate the primary bridge to obtain an accurate temperature, etc.

In aspects of the disclosure, compensation is provided for magnetoresitive (MR) elements due to one or more effects, such as temperature, stress and the like. In some embodiments, a first set of MR elements is configured in a bridge is to sense an applied magnetic field and a second set of MR elements, which are immune to the applied field, senses changes due to temperature, stress, and/or the like. In embodiments, units of MR elements are pinned using laser energy to heat the elements as part of the pinning process. The units of MR elements may be formed in multiple areas having quadrilateral symmetry.

FIG. 5A shows an example Wheatstone bridge 500 having first, second, third, and fourth MR elements 502a,b,c,d having respective pinning orientations indicated by respective arrows. A first leg of the bridge extends from node VTOP_P to the first MR element 502a, to the second MR element 502b to node VBOT_P. A second leg of the bridge extends from node VTOP_M to the third MR element 502c, to the fourth MR element 502d to node VBOT_P. The first and fourth MR elements 502a,d may comprise the same nominal resistance R1 and the second and third MR elements 502b,c may comprise the same nominal resistance R2. Nodes VOUT_P. VOUT_M provide an output voltage that corresponds to an applied magnetic field in the sensitive axis due to changes in resistance in the presence of the field. Wheatstone bridges of MR elements for sensing magnetic fields are well known in the art.

In an example embodiment, a node BT at the top of the bridge 500 has nodes VTOP_P and VTOP_M in common and a node BB at the bottom of the bridge has nodes VBOT_P and VBOT_M in common can be provided as inputs to an amplifier 504 the output of which can be connected to an ADC 506, which can be coupled to a processor 508. Due to the conductance mode nature of the bridge 500, the amplifier 202 of FIG. 2 applies a virtual short at the output of the bridge across nodes VOUT_P and VOUT_M. Thus, the bridge resistance as measured from BT to BB is effectively the two top anti-pinned devices (502a,c) in parallel and in series with the two bottom anti-pinned devices (502b,d) in parallel. The signal across node BT and BB corresponds to changes due to temperature, stress, etc., and the processor 508 can process this signal to adjust the sensitivity of the sensing bridge to applied magnetic fields by changing the primary bridge bias current or voltage, for example.

With this arrangement, additional area or matching requirements to the secondary device are not needed. In this embodiment, the bridge 500 is configured in current-driven conductance mode where current bias, Ib, is constant and voltage BT minus BB is measured to determine stress and/or temperature. A similar embodiment is voltage-driven resistance mode in which BT minus BB is supplied with a constant voltage and current through bridge is measured to determine stress and/or temperature. In embodiments, sensitivity and offset compensation can be achieved by processing signals obtained by the primary sensing bridge, instead of adjusting bridge bias directly, to avoid un-anticipated feedback loops.

FIG. 5B shows an example compensation circuit 520 in the form of a dummy resistance mode (secondary) bridge having first and second MR elements 522, 524 coupled in series to a current source CS. In the illustrated embodiment, the first and second elements 522, 524 are anti-pinned, as indicated by the opposite facing arrows 526, 528. A node 530 at the top of the bridge can be coupled to a signal monitor circuit, which may include an ADC and processor. The first and second elements 522, 524 are pinned so as to be immune to the sensitive axis of a primary bridge for sensing an applied magnetic field, such as the bridge 500 of FIG. 5A. It is understood that the compensation circuit 520 can replace circuitry, e.g., amplifier, ADC, etc., for sensing and processing a signal across BT, BB in FIG. 5A.

FIG. 5C shows a compensation circuit 550 having first and second MR elements 552, 554 pinned in opposite directions, as indicated by the arrows 556, 558, and connected in parallel such that their combined resistance is field independent. That is, an applied magnetic field causes one device 552 to increase in conductance and the other device 554 to decrease for a net change of zero due to the applied field. The MR elements 552, 554 have a conductance that is more linear over resistance vs field. To measure the temperature of the compensation circuit 550, the voltage across can be measured when driven with a temperature-independent current reference CS.

In embodiments, compensation circuit voltage can be digitized with an ADC and fed back to the signal path for digital compensation. In one particular embodiment, compensation can be performed using a segmentation processor in which different measurement regions have a separate first or higher order polynomial correction factor. The sensitivity and/or offset of the primary bridge signal path can then be adjusted based on the device temperature in the compensation circuit.

Figure 6B:
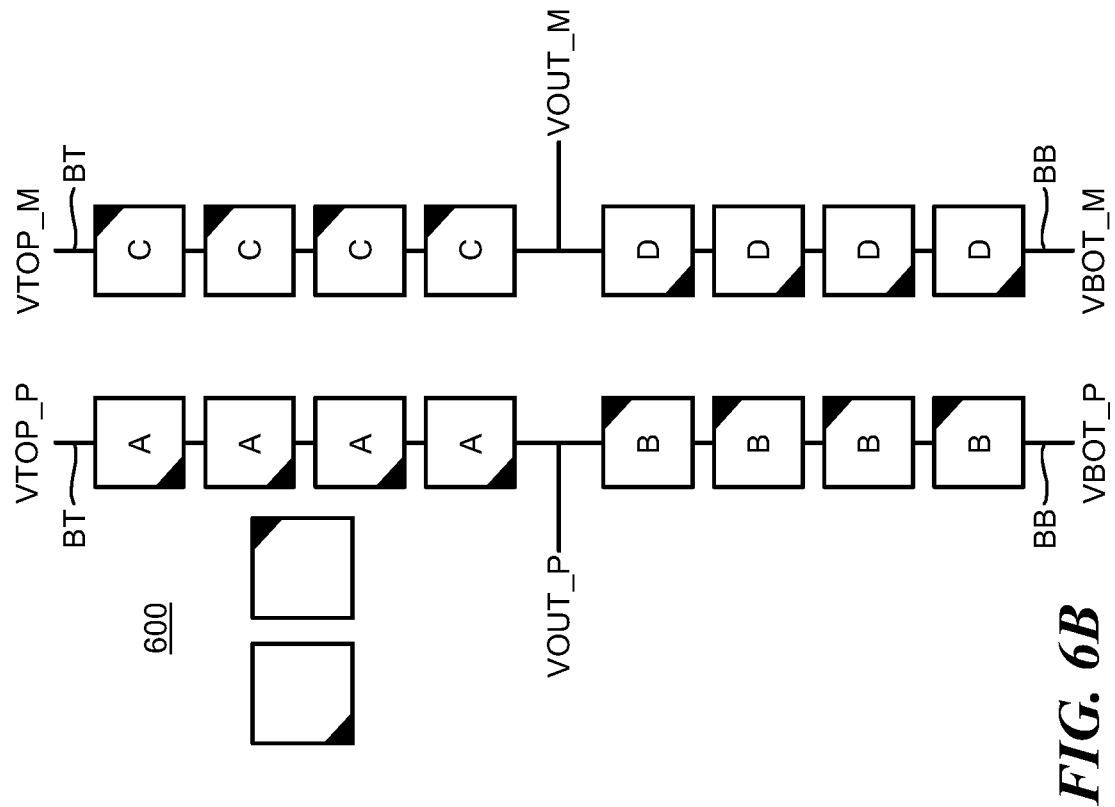
FIG. 6B is a circuit representation of the laser pining unit areas of FIG. 6A.
Figure 6A:
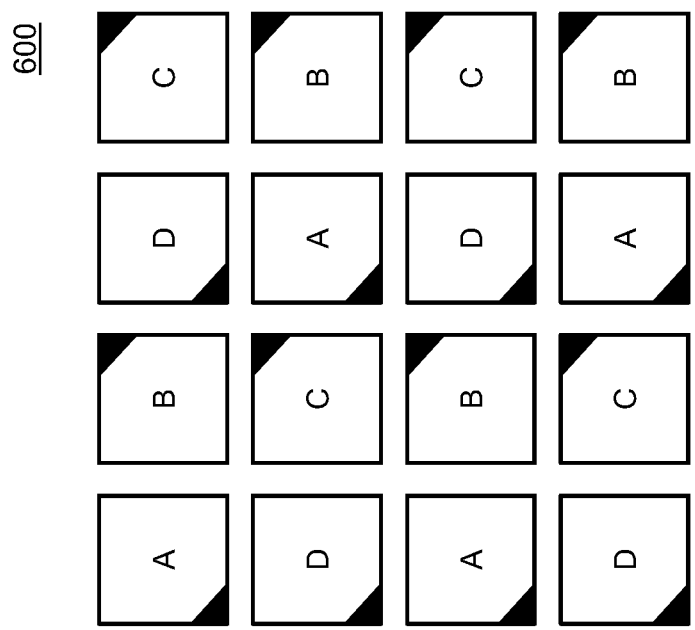
FIG. 6A is a schematic representation of laser pinning unit areas for an MR bridge.

FIG. 6A shows a bridge array 600 with an example element configuration in which each square represents an array of pillars within a 60 μm×60 μm area, for example, to be laser pinned. In embodiments, adjacent squares may be pinned in opposite directions. Spacing between squares should be at least 30 μm in example embodiments. Similarly pinned squares are indicated by the corner in which they are marked, such that squares with similar marking are similarly pinned. The four different types are also indicated as A, B, C, or D. A particular square can be referred to as a unit of laser pinning.

In the illustrated embodiment of FIG. 6B, each similar pillar array in FIG. 6A is shown routed in series to form a bridge, such as the bridge 500 of FIG. 5A, where like elements have like reference numbers. As can be seen, nodes VTOP_P. VTOP_M. VBOT_P, and VBOT_M, BT, and BB are similar in FIGS. 5A and 6B. In other embodiments, arrays can be in parallel or a combination of series and parallel. In each leg of the bridge, top and bottom are pinned in opposite directions i.e., A elements should be pinned in opposite direction of B elements and C elements be pinned in opposite direction of D elements. All elements in the bridge should match each other.

Figure 6C:
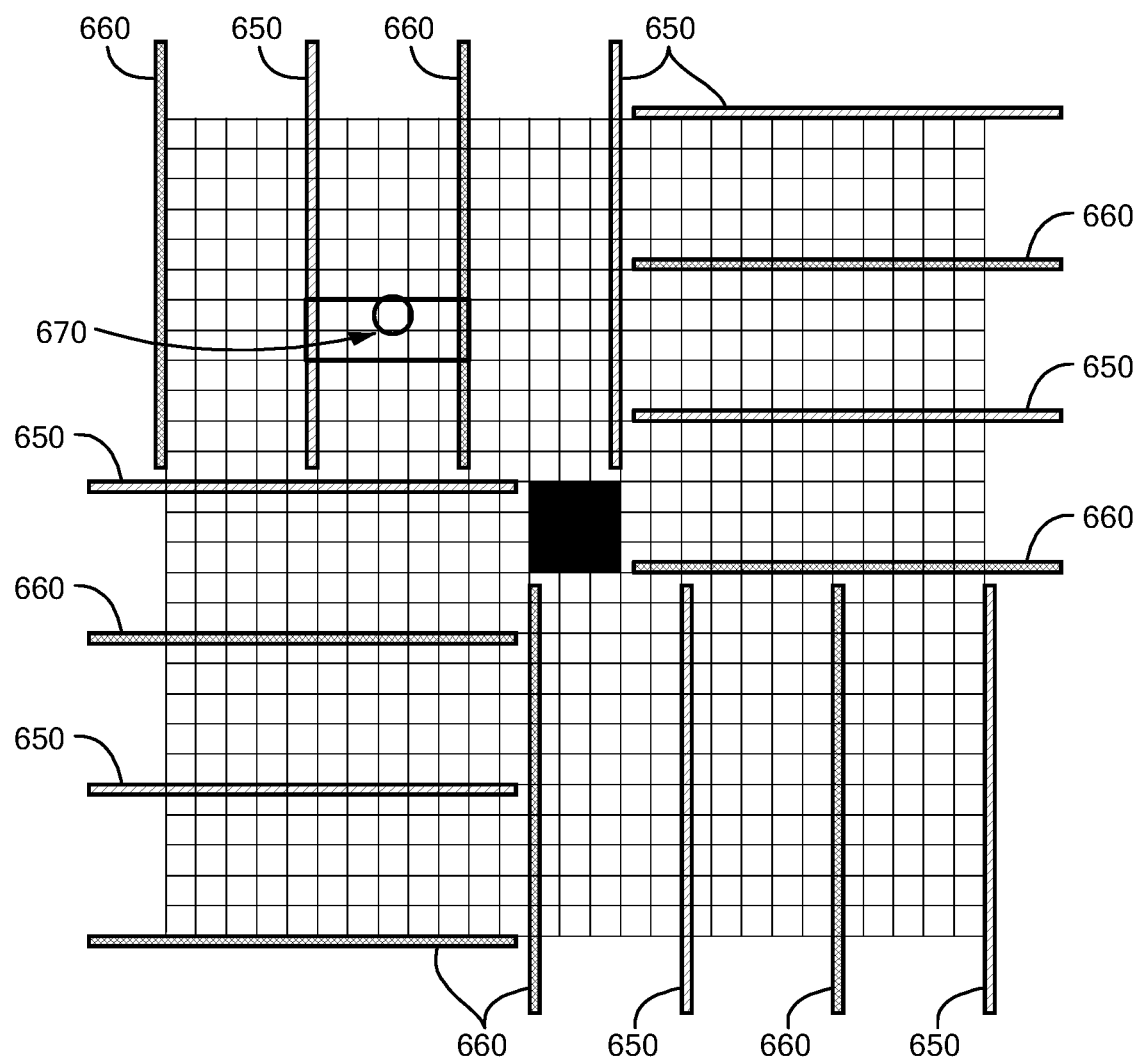
FIG. 6C is a more detailed view of one of the laser pinning unit areas of FIG. 6B.

FIG. 6C zooms in on a single TMR pillar array unit from FIG. 6B. First routing 650 and second routing 660 represent respective electrical connections at the top and bottom of the array. The first routing 650 forms a first node and second routing 660 forms a second node. In the illustrated embodiment, the example unit includes a total of 27×27=729 vortex TMR pillars. Pillars of the array are grouped in 72 parallel elements 670 of ten series pillars for a total of 720 active pillars and 9 dummy pillars, which are in the center of the unit. Each element 670 can be arranged as one pair by 5 rows, as shown.

To target a specific overall resistance in the unit area, a specific series/parallel combination of TMR pillars may be configured. For best area utilization it may be beneficial to separate the devices into groups arranged in a quadrilateral symmetric pattern. Such an arrangement can minimize the number of metal layers for routing and eliminate the need to route in between TMR pillars.

Figure 7:
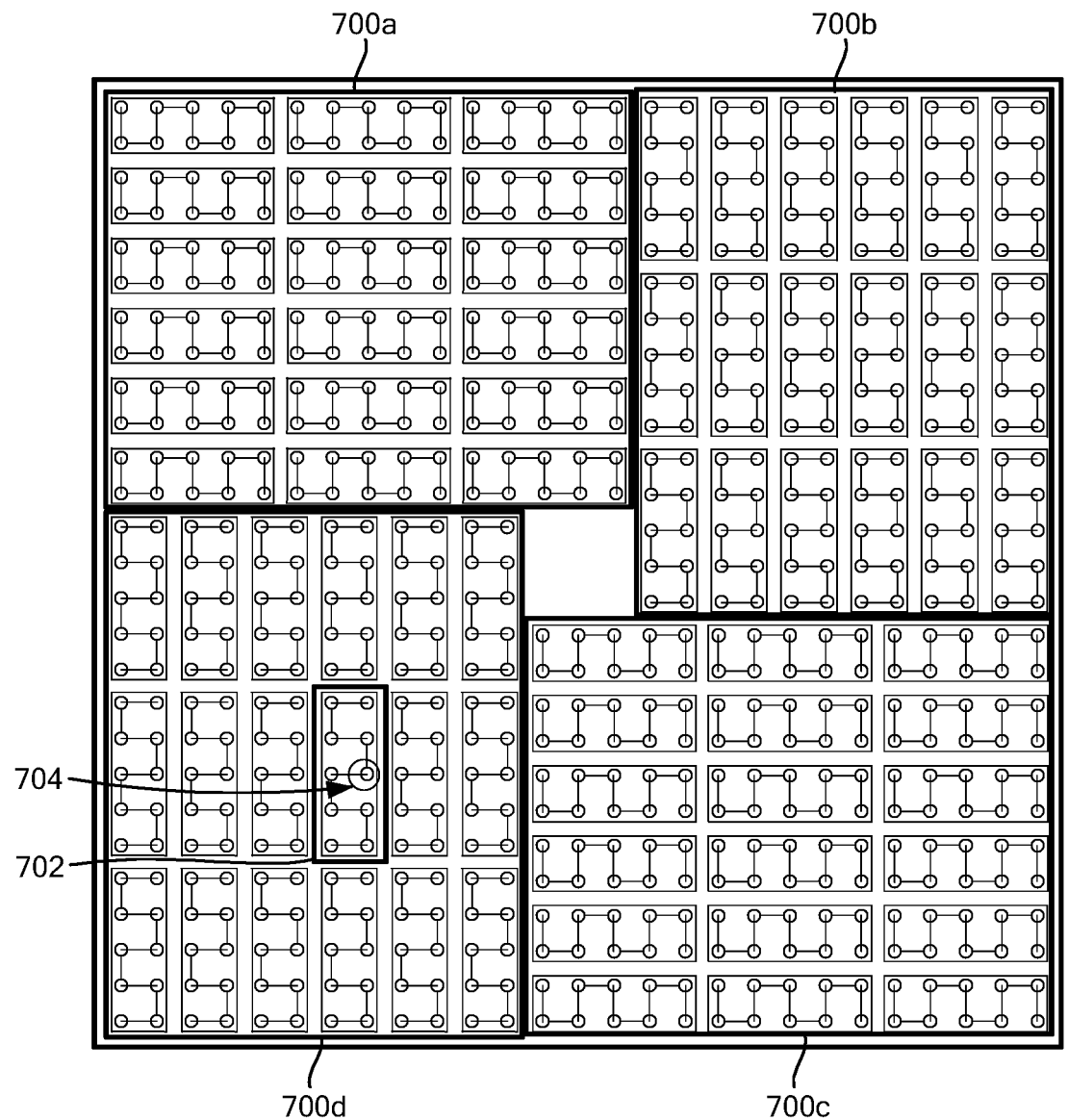
FIG. 7 is a layout of an example laser pinning unit area with subgroups having symmetric quadrilaterals.

FIG. 7 shows an example layout representation of the laser pinned pillar array unit in FIGS. 6B and 6C. As can be seen, the layout includes first, second, third, and fourth identical sub-groups 700a,b,c,d configured to have quadrilateral symmetry. As used herein, a quadrilateral is a four sided polygon having four edges and four corners and can be simple or complex. In the illustrated embodiments, each sub-group 700 contains eighteen elements. An example element 702 contains ten series TMR pillars, one of which is indicated with a red arrow 704. The elements are represented as a 1 pair by 5 row bussed instance.

In the illustrated embodiment, each of sub-groups 700*a,b,c,d* is a rectangle each having the same dimensions and configured for efficient routing internally and to other units.

Figure 8A:
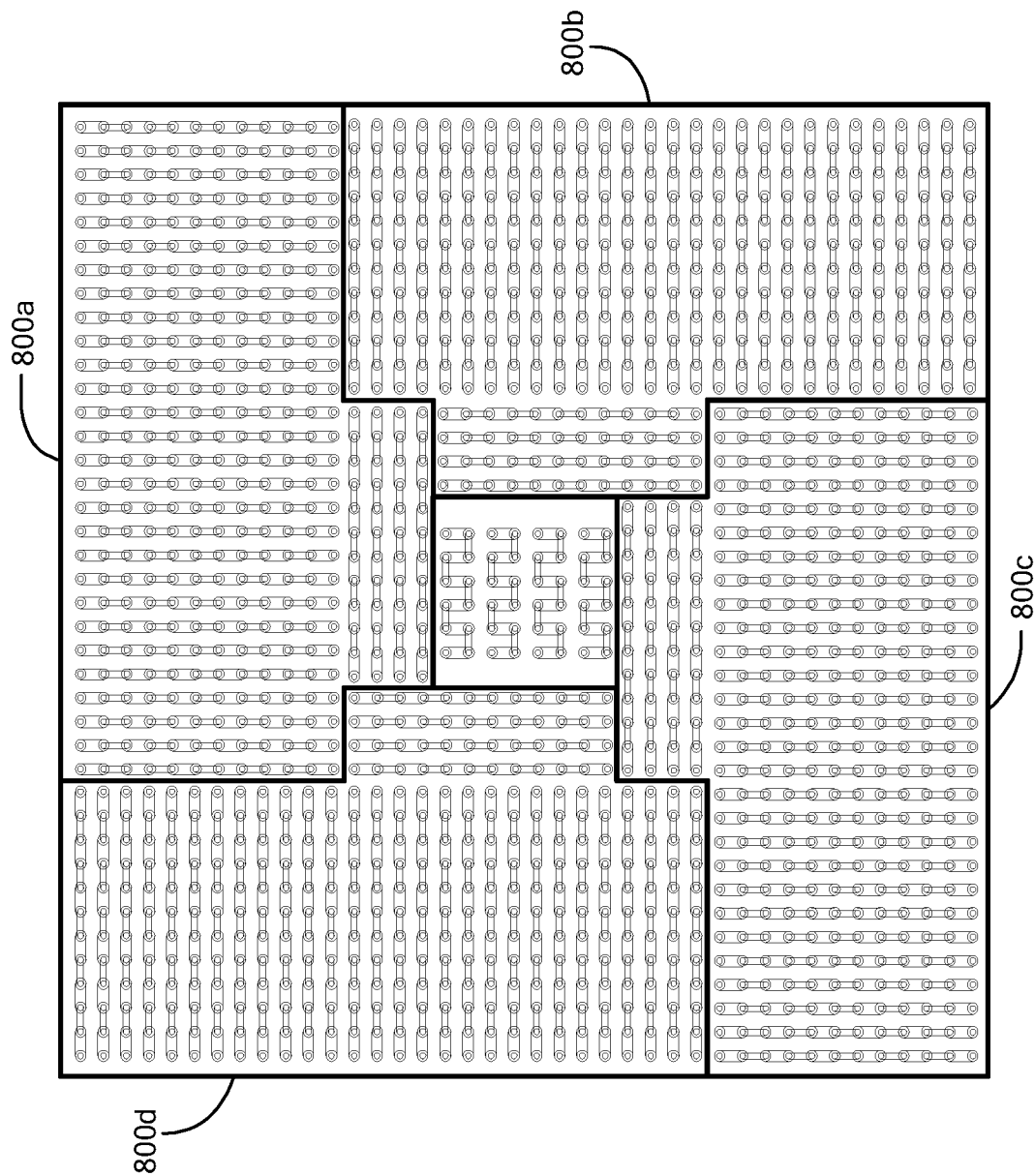
FIG. 8A is a layout of an example laser pinning unit area with subgroups having symmetric compound quadrilaterals.

FIG. 8A shows an example laser pinning layout with a TMR pillar unit size and spacing reduced as compared to the unit of FIG. 7 so that a larger number of pillars can fit in the same laser pinning array area. As is known in the art, typical layout spacing rules prevent routing in between TMR pillars. As can be seen, the unit has four subgroups 800*a,b,c,d* that are symmetric with respect to each other. In the illustrated embodiment, each of the subgroups 800 includes first and second quadrilaterals to form a unit have eight sides. As used herein, a compound quadrilateral refers to a shape have some number of quadrilaterals combined together.

It is understood that unit layouts can include any practical number of symmetrical geometries to meet the needs of a particular application.

Figure 8B:
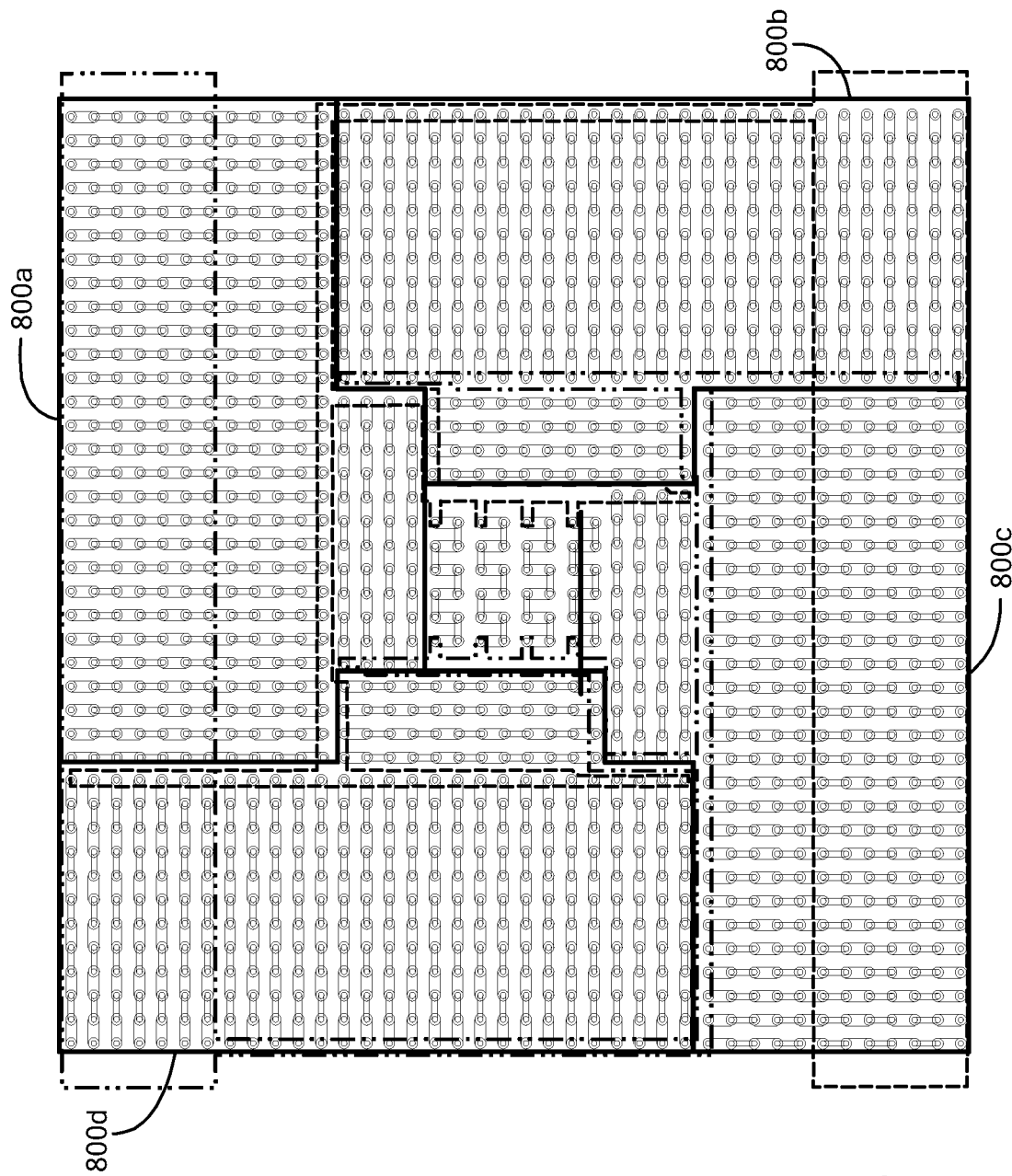
FIG. 8B shows the layout of FIG. 8A with example routing.

FIG. 8B is similar to FIG. 8A with the addition of quadrilateral symmetric routing that allows for a continuous trace to connect the devices on the outer edge to the center for maximizing area utilization. A smaller pillar size provides a wider magnetic field sensitivity range but may be more prone to process induced device-to-device mismatch.

Figure 9:
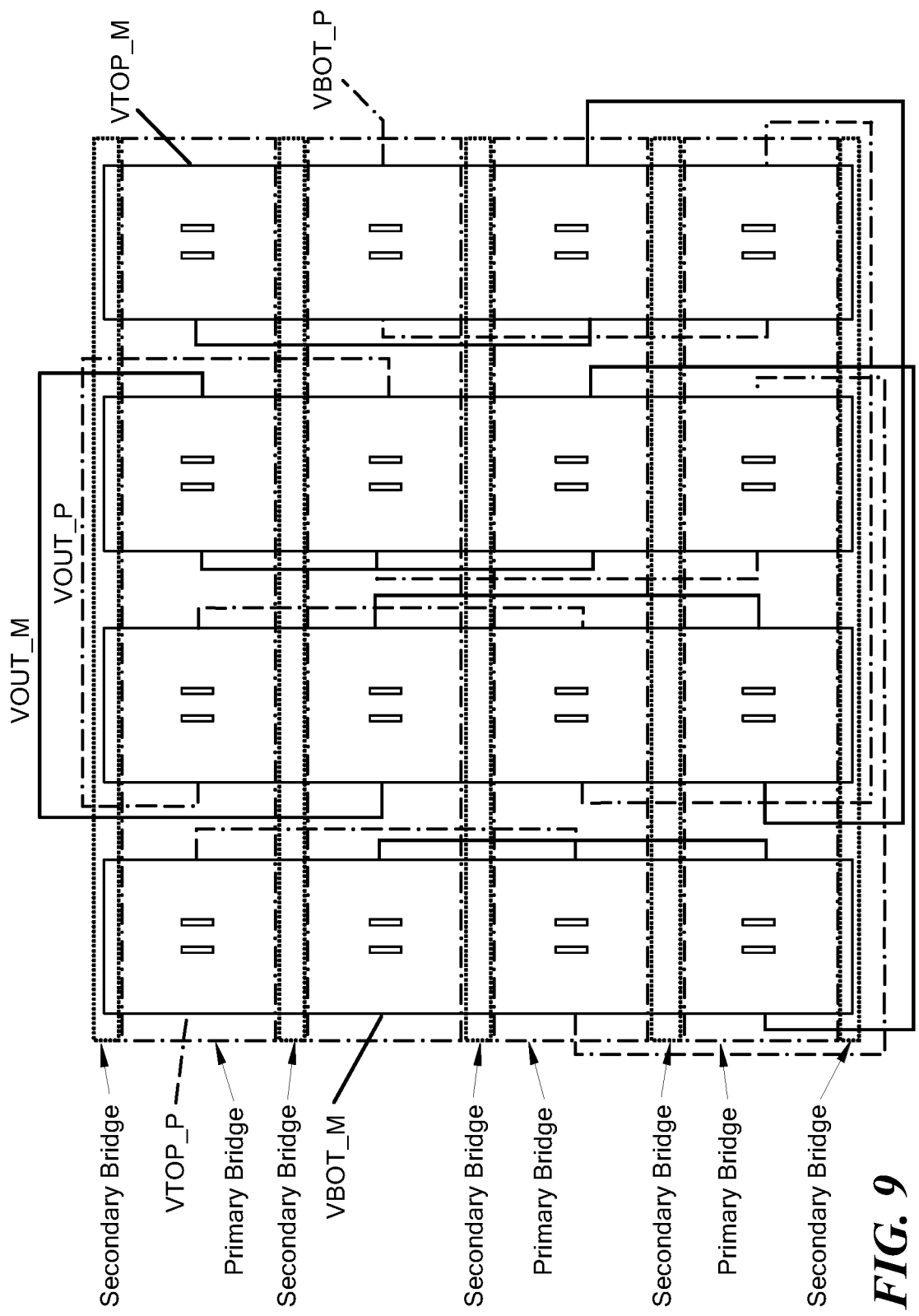
FIG. 9 is an example layout showing primary and secondary bridges.

FIG. 9 shows an example layout with locations of primary bridge components and secondary bridge components. In example embodiments, the secondary bridges require less area and less routing than the primary bridge, such as in the embodiments of FIGS. 5B and 5C. As can be seen, the secondary bridge(s) are close to the primary bridge so that the temperature of both bridges will be the same. That is, a temperature sensing bridge is interleaved between rows of the primary bridge for matching device operating characteristics to provide for accurate temperature compensation of the primary bridge based on accurate temperature sensing from the temperature sensing bridge.

Figure 10:
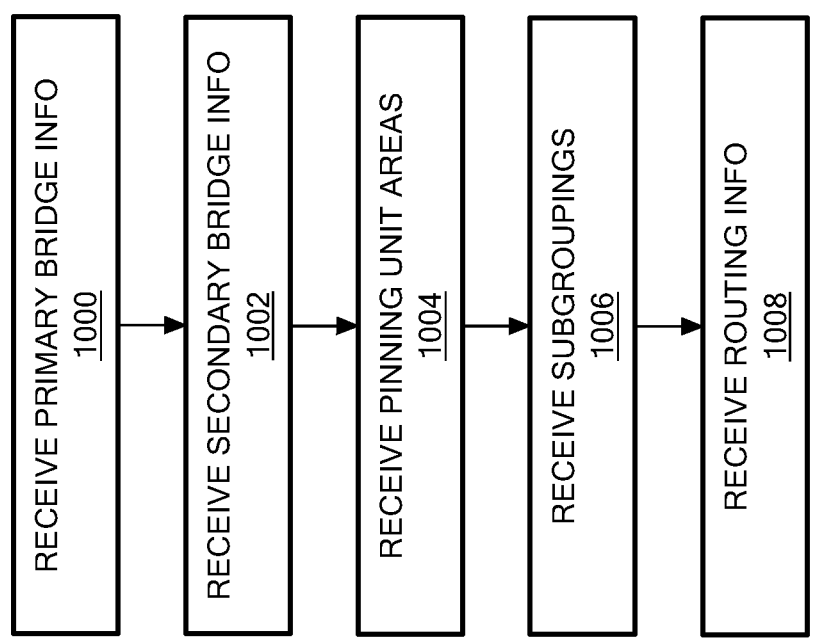
FIG. 10 is a flow diagram showing an example sequence of steps for MR sensor element compensation.

FIG. 10 shows an example sequence of steps for providing MR element compensation. In step 1000, information for a primary bridge is received. In step 1002, information for a secondary bridge is received. In step 1004, pinning information for unit areas is received. In step 1006, subgroupings for the unit areas are received. In embodiments, subgroups can have symmetric quadrilaterals for efficient use of space and routing. In step 1008, routing information is received. The primary and secondary bridges can be formed in a layout that provides compensation for temperature, stress, etc.

Figure 11:
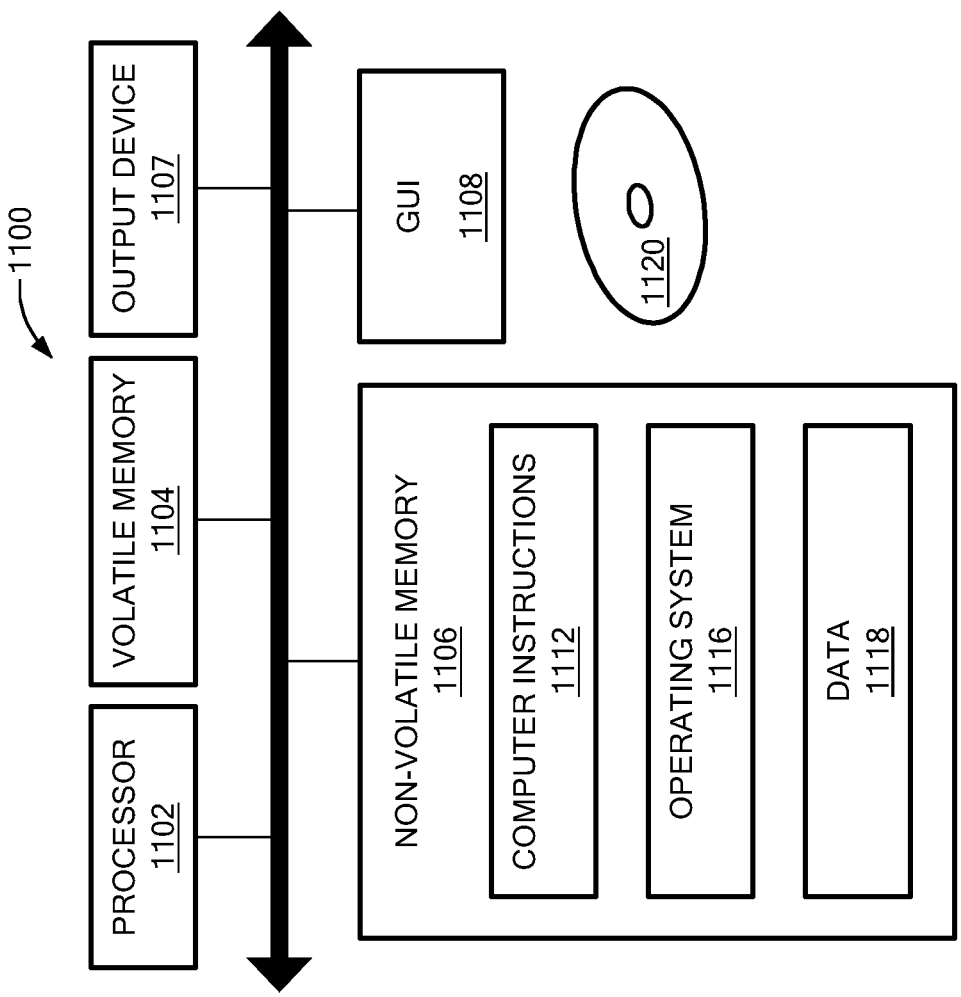
FIG. 11 is a schematic representation of an example computer that can perform at least a portion of the processing described herein.

FIG. 11 shows an exemplary computer 1100 that can perform at least part of the processing described herein. The computer 1100 includes a processor 1102, a volatile memory 1104, a non-volatile memory 1106 (e.g., hard disk), an output device 1107 and a graphical user interface (GUI) 1108 (e.g., a mouse, a keyboard, a display, for example). The non-volatile memory 1106 stores computer instructions 1112, an operating system 1116 and data 1118. In one example, the computer instructions 1112 are executed by the processor 1102 out of volatile memory 1104. In one embodiment, an article 1120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as special purpose logic circuitry (e.g., an FPGA (field programmable gate array) and/or an ASIC (application-specific integrated circuit)).

As used herein, the term "anisotropy" or "anisotropic" refer to a particular axis or direction to which the magnetization of a ferromagnetic or ferrimagnetic layer tends to orientate when it does not experience an additional external field. An axial anisotropy can be created by a crystalline effect or by a shape anisotropy, both of which allow two equivalent directions of magnetic fields. A directional anisotropy can also be created in an adjacent layer, for example, by an antiferromagnetic layer, which allows only a single magnetic field direction along a specific axis in the adjacent layer.

In view of the above, it will be understood that introduction of an anisotropy in a magnetic layer results in forcing the magnetization of the magnetic layer to be aligned along that anisotropy in the absence of an external field. In the case of a GMR or TMR element, a directional anisotropy provides an ability to obtain a coherent rotation of the magnetic field in a magnetic layer in response, for example, to an external magnetic field.

In general, magnetic materials can have a variety of magnetic characteristics and can be classified by a variety of terms, including, but not limited to, ferromagnetic, antiferromagnetic, and nonmagnetic. Description of the variety of types of magnetic materials is not made herein in detail. However, let it suffice here to say, that a ferromagnetic material is one in which magnetic moments of atoms within the ferromagnetic material tend to, on average, align to be both parallel and in the same direction, resulting in a nonzero net magnetic magnetization of the ferromagnetic material.

An antiferromagnetic material is one in which magnetic moments within the antiferromagnetic material tend to, on average, align to be parallel, but in opposite directions in sub-layers within the antiferromagnetic material, resulting in a zero net magnetization.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field. As used herein, the terms "target" and "magnetic target" are used to describe an object to be sensed or detected by a magnetic field sensor or magnetic field sensing element.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise specified, the term "substantially" refers to values that are within ±10%. For example, a first direction that is "substantially" perpendicular to a second direction may refer to a first direction that is within ±10% of making a 90° angle with the second direction.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor, comprising:
   a first set of MR elements forming a bridge to output a signal corresponding to an applied magnetic field having an orientation in a sensitive axis of the bridge;
   a second set of MR elements that are immune to the applied magnetic field, wherein the second set of MR elements are configured to change in resistance due to temperature; and a processor to compensate for a response of the first set of MR elements based on an output from the second set of MR elements.

2. The sensor according to claim 1, wherein the second set of MR elements include anti-pinned first and second MR elements coupled in series.

3. The sensor according to claim 1, wherein the second set of MR elements include first and second MR elements coupled in parallel that are pinned in opposite directions.

4. The sensor according to claim 1, wherein the second set of MR elements comprise at least four MR elements configured in a Wheatstone bridge configuration.

5. The sensor according to claim 1, wherein the MR elements in the first and second sets of elements comprise TMR elements.

6. A method, comprising:
employing a first set of MR elements forming a bridge to output a signal corresponding to an applied magnetic field having an orientation in a sensitive axis of the bridge in a magnetic field sensor;
employing a second set of MR elements that are immune to the applied magnetic field, wherein the second set of MR elements are configured to change in resistance due to temperature; and
performing processing to compensate for a response of the first set of MR elements based on an output from the second set of MR elements.

7. The method according to claim 6, wherein the second set of MR elements include anti-pinned first and second MR elements coupled in series.

8. The method according to claim 6, wherein the second set of MR elements include first and second MR elements coupled in parallel that are pinned in opposite directions.

9. The method according to claim 6, wherein the second set of MR elements comprise at least four MR elements configured in a Wheatstone bridge configuration.

10. The method according to claim 6, wherein the MR elements in the first and second sets of elements comprise TMR elements.

\* \* \* \* \*